March 18, 1941.   A. JUHL   2,235,259
INSURANCE FORM
Filed July 29, 1939   2 Sheets-Sheet 1

INVENTOR.
ARTHUR JUHL
BY
ATTORNEY.

Figures 3, 4, 5:
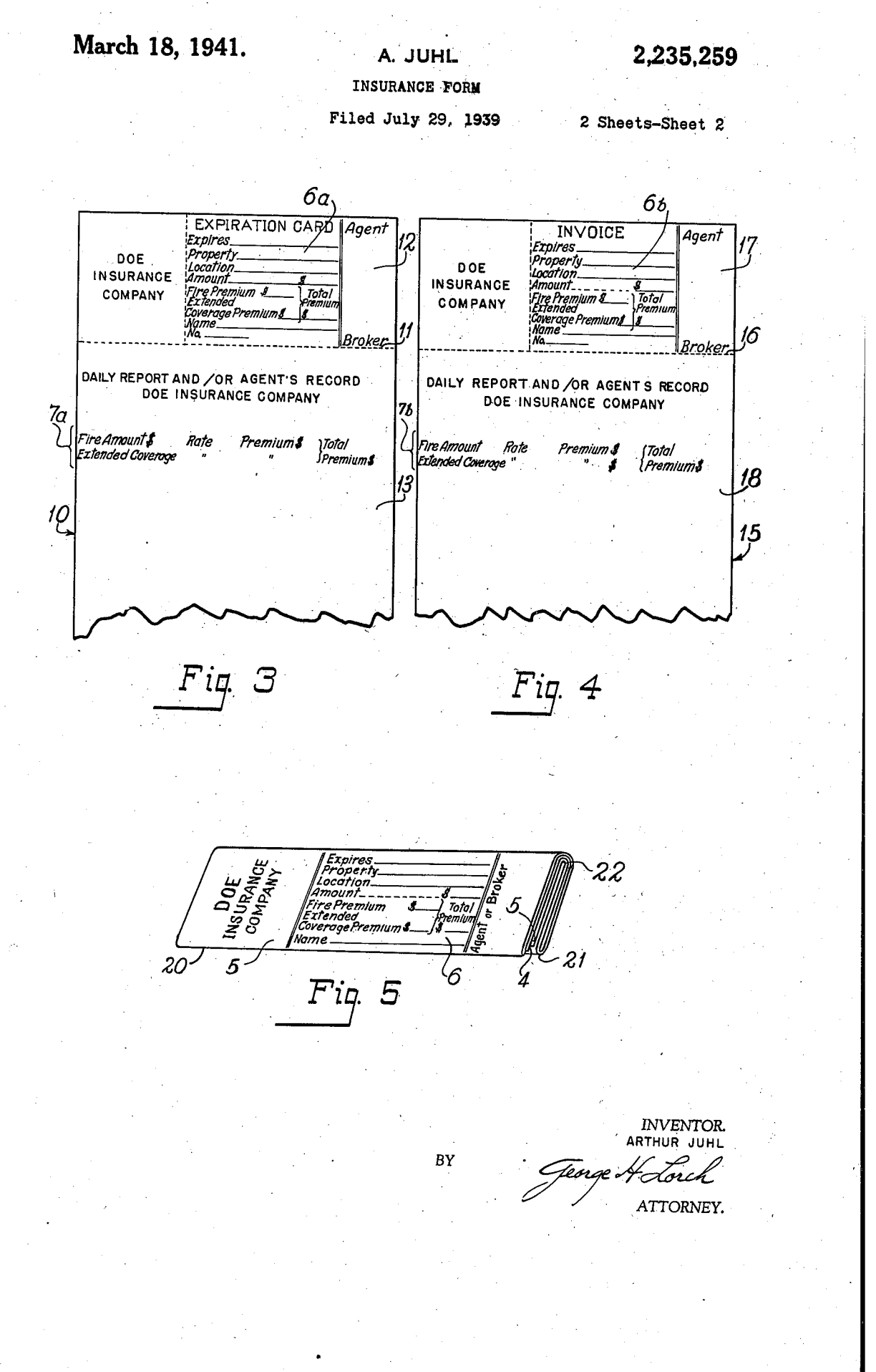

March 18, 1941.　　　　　　A. JUHL　　　　　　2,235,259
INSURANCE FORM
Filed July 29, 1939　　　2 Sheets-Sheet 2

INVENTOR.
ARTHUR JUHL
BY George H. Lorch
ATTORNEY.

Patented Mar. 18, 1941

2,235,259

UNITED STATES PATENT OFFICE 2,235,259

INSURANCE FORM

Arthur Juhl, Chicago, Ill., assignor of one-half to Louis M. Gundel, Chicago, Ill.

Application July 29, 1939, Serial No. 287,237

3 Claims. (Cl. 282—27)

This invention relates to forms for insurance policies or the like and has for its purpose the provision of a set of forms comprising a continuous front and back sheet which may be readily bound into a pad and detached for use in combination with intermediate sheets or records and which will facilitate the preparation of an insurance policy and the accompanying records incident thereto.

Other and further objects of this invention and their resultant advantages will be apparent from the following description taken in connection with the drawings, in which:

Fig. 3 is a plan view of an expiration card and daily report or record sheet;

Fig. 4 is a plan view of an invoice sheet; and

Fig. 5 is a perspective view of a policy folded for filing or delivery.

Figure 1:
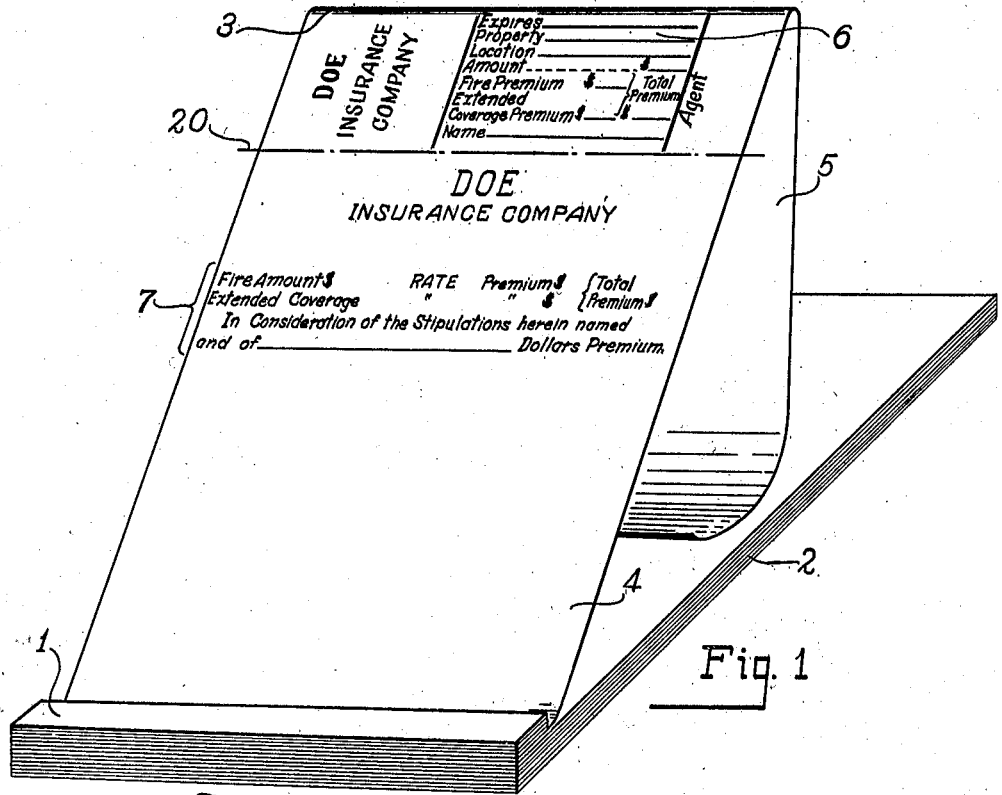
Figure 1 is a perspective view of a pad of policy forms, i. e., integral front and back sheets constructed and arranged in accordance with this invention.

In order that this invention may be better understood, it is desirable to briefly review the procedure now used in the preparation and issuance of an insurance policy and briefly describe the forms now used. The forms now employed are usually supplied in pads of forms and each form comprises a continuous sheet folded upon itself at its center to provide a front and rear sheet, i. e., the first, second, third and fourth pages of the policy. The first page, as well as the second and third pages, are ruled horizontally, and parallel to the fold and to the width of the sheet, whereas the rear page or back sheet has an intermediate portion thereof ruled parallel to the length of the sheet, that is, perpendicular to the fold and to the other ruling and printing on the sheet. This latter ruled portion bears indicia of the company issuing the policy and rulings for the coverage and payment data, all of which appears on the outside of the policy when the completed policy is folded in the usual manner for filing or delivery.

In use, the agent who has "sold" a policy sends the necessary data to the home or main office and a blank policy form is detached from a pad of such forms and inserted in a typewriter so that the proper entries may be made upon the front or first page, the entries of course being made along lines parallel to the fold or the width of the page. After the necessary data has been entered upon the first three pages of the form the form is removed from the machine and reinserted sideways into the machine (rotated through 90 degrees). This means that the form must be folded to permit its entry into a standard typewriter carriage or inserted in a special wide carriage typewriter so that duplicate entries may be made upon the center portion of the rear page on lines parallel to the length of the policy and perpendicular to the fold. When making these entries of coverage and payment data upon the rear page of the policy the policy form is of course inserted in the typewriter in such a manner that the operator cannot see the entries originally made on page 1 of the policy. Accordingly, it is very easy for the operator to make an erroneous entry on the rear page. After the rear page has had the necessary entries made thereon the form again is removed from the typewriter and the operator must then fill out certain incidental records such as an expiration card or sheet, as well as a daily or agent's report and an invoice, all of which carry the same coverage and payment data that has been entered upon the first page of the policy in one direction of print, as well as upon the rear page thereof in another direction of print. In other words, four series of operations are necessary to fill out the policy forms and incidental records mentioned.

In accordance with this invention, the identification, coverage and payment data upon the rear page of the policy, the payment and coverage data upon the first page of the policy as well as upon the expiration card or sheet, the daily agent's report, and the bill or invoice, can all be made in one set of operations without removing the policy form and intermediate record sheets from the machine. When it is considered that all large insurance companies employ many operators who do nothing but fill out forms and records all day long, the saving made by the use of a set of forms constructed and arranged in accordance with this invention will be appreciated.

Figure 2:
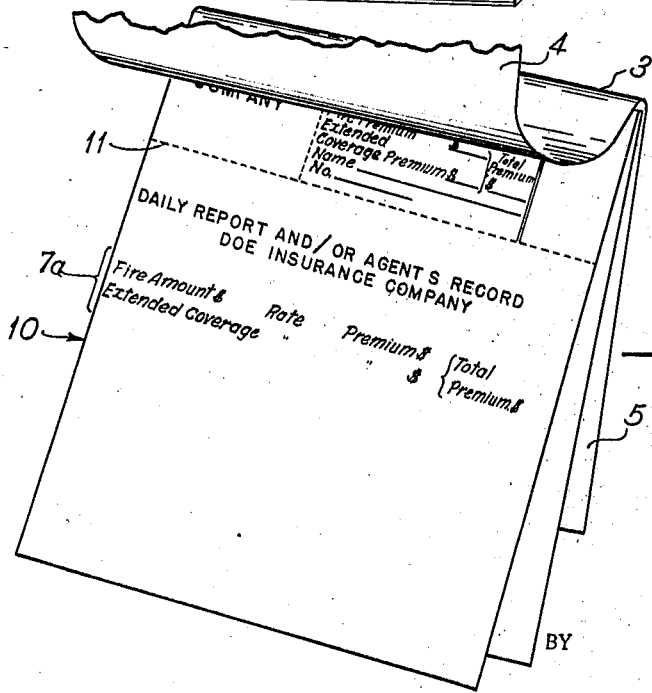
Fig. 2 is a perspective view of a complete set of forms including a detached integral front and back sheet, an expiration card, daily report, and invoice.

As can be seen from Fig. 2, the complete set of forms constructed and arranged in accordance with this invention comprises a continuous, outer elongated cover or sheet (Fig. 1) having a detachable stub portion 1 adapted to be bound into a flat pad 2 of forms. The sheet is folded upon itself across its width and parallel thereto at 3 to provide a relatively long front sheet 4 and a shorter rear sheet 5. The upper left portion of the front sheet 4 adjacent the fold 3 has printed thereon the name and address of the company issuing the policy. This printing may be along lines parallel to the length or to the width of the sheet as may be desired. The upper right side portion of sheet 4 adjacent the fold is ruled horizontally, i. e., parallel to the fold 3 and to the width of the sheet to provide lines 6 for the entry of coverage and payment data. The lower or main body portion of the first page also bears the name of the company issuing the policy and is further ruled, as at 7, along lines parallel to the fold or width of the sheet to provide a second entry of the coverage and payment data, as is usual on the first page of an insurance policy. The main body portion of the front page of the policy also contains printed conditions and agreements of the policy. Pages 2 and 3 of the folded sheet may be ruled and printed in the usual manner along lines parallel to the fold and width of the form.

The rear sheet 5 may also be printed to contain the data usually found on the back page of an insurance policy. This back page, as originally folded, may also be printed at one portion to indicate the name of the company and agent issuing the policy if so desired.

The folded form comprising sheets 4 and 5, ruled and folded as described above, is particularly useful in combination with intermediate sheets or records when also ruled in accordance with this invention. According to this invention, after the folded form is detached from the pad 2 and before the form is inserted in the typewriter, a second or intermediate sheet 10 is inserted between the front and rear connected sheets 4 and 5. This second sheet is scored, as at 11, to provide an upper detachable stub portion 12 constituting an expiration card or record and a lower or body portion 13 comprising a daily report or agent's record for use in the home office of the company issuing the policy. The upper detachable stub portion 12 is ruled and printed, as at 6ª, in a manner identical to the upper right portion 6 of sheet 4 of the policy form and in position to directly underlie the latter so that, when the intermediate sheet 12 is placed between the two connected sheets 4 and 5 and the coverage and payment data is typed on the front sheet, it will be duplicated by the use of a carbon paper upon the upper stub portion 12 or expiration card. The lower portion of the intermediate sheet is ruled, as at 7ª, similarly to the ruling 7 on the main portion of the front sheet 4 so that when the second entry of the coverage and payment data is made upon sheet 4 it will be duplicated on the lower portion 13 or report record of the intermediate sheet 10.

A third intermediate sheet 15 comprising an invoice or bill is also inserted in the set of forms either above or beneath the expiration card. This sheet is scored at 16 to provide an upper portion or bill 17 which is ruled, as at 6ᵇ, similarly to the rulings 6 and 6ª of the upper portions of sheets 4 and 13, and a lower portion 18 ruled as at 7ᵇ similarly to the rulings 7 and 7ª of the lower portion of sheets 4 and 13 so that, when the entries are made concerning the coverage and payment data on the first sheet 4, they are made in triplicate on the sheet or bill 15.

From the foregoing it will be apparent that, by inserting the set of forms comprising the integral sheets 4 and 5 folded along the line 3 and the desired number of intermediate sheets 13 and 15, the policy both front and back, as will be explained later, and all office records including the expiration card, the daily report, and the invoice, may be filled in with the necessary coverage and payment data in one series of operations without removing the set of forms from the machine. It will also be obvious that, while the operator is entering the coverage and payment data for the second time on the front page, the exact data which is entered for the second time appears before the operator on the upper portion of the sheet being typed so that there is no chance of an erroneous entry.

After the forms including all of the above records have been typed in one series of operations, the completed set of forms are removed from the machine and the intermediate leaves 13 and 15 extracted from the set of forms. The connected front and rear pages 4 and 5 are then refolded at approximately the center of the policy form, i. e., along line 20 (Fig. 1) which refolding places what was originally the top of the front page at the top of the rear page in a position so that one set of coverage and payment data entries appears on the back of the policy form as well as on the front. The refolded policy can then be folded double at 21 and 22 (Fig. 5) in the usual manner so that what was originally the top of the front page and later the top of the back page becomes the outside of the folded policy.

From the foregoing it will be seen that at least three operations are eliminated in the preparation of a complete insurance policy and incidental records, i. e., they may all be performed together with the first operation as one set of operations. Furthermore, instead of removing the policy from the typewriter, reinserting it folded or unfolded in a special typewriter for the entry upon its back, the policy and incidental records are inserted together in the machine only once and a standard width machine may be employed.

It will be obvious that the particular printing illustrated and certain details of arrangement thereof may be varied without departing from the spirit and scope of this invention as defined in the appended claims.

I claim:

1. A form for an insurance policy or the like comprising a continuous sheet folded at its mid point having a detachable stub portion projecting from one end adapted to be bound into a pad and said folded sheet being adapted to be folded upon itself along a line offset from said mid point to provide an integrally connected front sheet and a relatively shorter back sheet, the front sheet as so folded being horizontally ruled at its upper portion adjacent said new fold and parallel thereto to provide spaces for the entry of coverage and payment data, said latter ruled portion and spaces occupying a portion equal to one half the difference in length between said front and back sheets, the main portion of said front sheet below said upper portion being further ruled horizontally and parallel to said new fold and to the width of said sheet to provide spaces for a second entry of said coverage and payment data, the main portion of said front sheet also containing spaces for printed conditions and stipulations of the policy, said back sheet being printed and ruled parallel to said fold to provide spaces for the entry of policy information, said main portion of said front sheet being arranged and adapted to be refolded upon itself at its mid point after being completed, between the two sets of spaces on said front sheet ruled for coverage and payment data whereby the upper portion which formed the top of the front sheet when folded off center again becomes the top of the back sheet to provide a policy form having connected front and back sheets of substantially equal length and which latter top portion also becomes the outside identifying section when the policy is further folded twice upon itself for delivery or filing.

2. A form for an insurance policy or the like comprising a continuous sheet folded upon itself to provide an integrally connected front sheet and a relatively shorter back sheet, the front sheet having spaces upon one upper portion adjacent said fold adapted to receive indicia indicating the name of the company issuing the policy and having spaces horizontally ruled at another upper portion adjacent said fold and parallel thereto for the entry of coverage and payment data, said spaces occupying a portion equal to one half the difference in length between said front and back sheets, the main portion of said front sheet below said upper portion having further spaces ruled horizontally and parallel to said fold and to the width of said sheet to provide for a second entry of said coverage and payment data, the main portion of said sheet also having spaces containing printed conditions and stipulations of the policy, said back sheet having spaces printed and rule parallel to said fold for the entry of policy information, said continuous sheet being adapted to be refolded upon itself after being completed, along a center line between the said two portions on said front sheet having spaces ruled for coverage and payment data whereby the upper portion which originally formed the top of the front sheet becomes the top of the back sheet to provide a policy form having connected front and back sheets of substantially equal length and which latter portion also becomes the outside identifying section when the policy is further folded for delivery or filing.

3. A set of forms for insurance policies or the like comprising a continuous sheet folded upon itself to provide an integrally connected front sheet and a relatively shorter back sheet, the front sheet having spaces horizontally ruled at its upper portion adjacent said fold and parallel thereto for the entry of coverage and payment data, said ruled portions and spaces occupying a portion equal to one half the difference between the length of said front and back sheets, the main portion of said front sheet below said upper portion having additional spaces ruled horizontally and parallel to said fold and to the width of said sheet to provide for a second entry of said coverage and payment data, the main portion of said front sheet also containing spaces having printed conditions and stipulations of the policy, said back sheet having spaces printed and ruled parallel to said fold for the entry of policy information; and an intermediate sheet disposed between the connected front and back sheets of said form, said intermediate sheet having a detachable upper portion having spaces equal in size and ruled similarly to the upper portion of said front sheet for the simultaneous duplicate entry of coverage and payment data and the main portion of said intermediate sheet also having spaces ruled horizontally similarly to the coverage data portion of the main portion of said front sheet for receiving simultaneously a duplicate entry thereof; said continuous sheet being adapted to be refolded upon itself after being completed, along a line between the two set of spaces on said front sheet ruled for coverage and payment data whereby the upper portion which originally formed the top of the front sheet becomes the top of the back sheet to provide a policy form having connected front and back sheets of substantially equal length and which latter top portion also becomes the outside identifying section when the policy is further folded for delivery or filing.

ARTHUR JUHL.